Apr. 10, 1923.
C. F. WAGNER
ELECTROPERCUSSIVE WELDING SYSTEM
Filed May 14, 1921
1,451,558
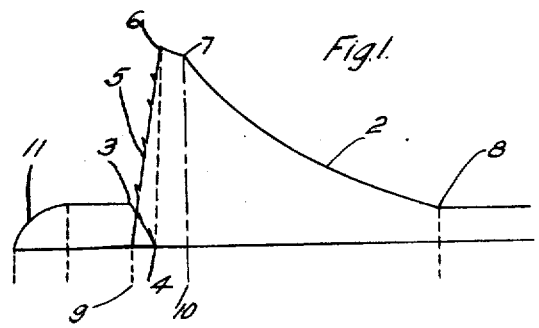
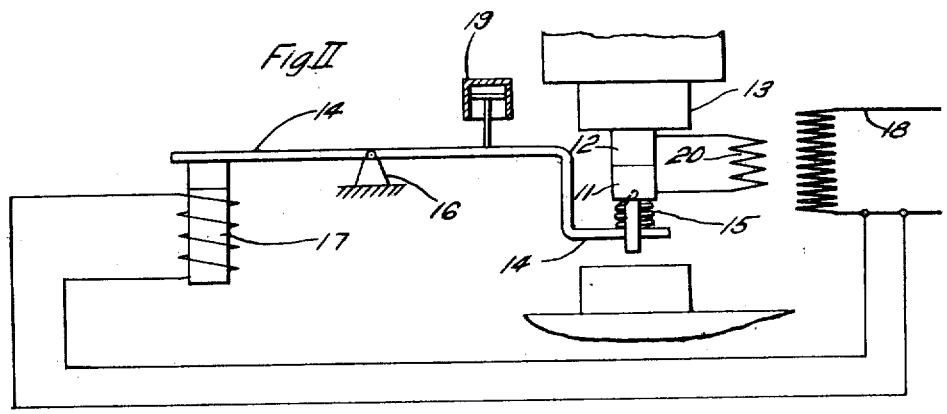
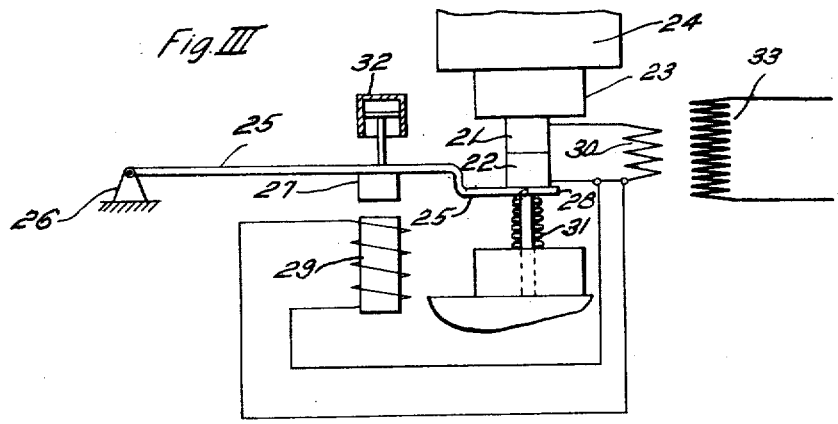
WITNESSES:
INVENTOR
Charles F. Wagner.
BY
Wesley G. Carr
ATTORNEY Patented Apr. 10, 1923.

1,451,558

UNITED STATES PATENT OFFICE.

CHARLES F. WAGNER, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTROPERCUSSIVE WELDING SYSTEM.

Application filed May 14, 1921. Serial No. 469,499.

*To all whom it may concern:*

Be it known that I, CHARLES F. WAGNER, a citizen of the United States, and a resident of Pittsburgh, in the county of Allegheny and State of Pennsylvania, have invented a new and useful Improvement in Electropercussive Welding Systems, of which the following is a specification.

My invention relates to electro-percussive welding systems, more especially to means for automatically controlling the functioning of the various working parts in such systems.

Various schemes for automatically timing the operation of electro-percussive welding apparatus, including trip mechanisms in which the actuated members operate to open and close certain contact switches connected to circuits, release levers and the like have been proposed. These devices were usually combinations of mechanical and electrical elements and, although they performed fairly well the duties for which they were intended, they were rather complicated and did not function perfectly at all times.

My invention provides automatic electric timing means for controlling the functioning of electro-percussive welding systems, it being among the objects thereof to provide a control means that shall be reliable, simple in construction and positive in operation.

To join a plurality of metal conductors or wires by electro-percussive welding, such bodies are secured in a suitable apparatus having gripping members which are connected to a secondary winding of a transformer. The bodies are maintained in engagement and the primary winding of the transformer is connected to a source of direct current to establish a magnetic field which links with the secondary winding. The primary circuit may then be opened to cause the magnetic field to collapse and induce a current in the secondary circuit which includes the electrodes to be welded. During the discharge of energy, caused by the collapse of the magnetic field, the electrodes are separated, causing an arc to be drawn therebetween, and percussive engagement is then effected between the electrodes.

In practicing my invention, I take advantage of the electrical time lag between the collapse of the primary field and the building up of the current induced in the secondary, and connect solenoids or magnets within these circuits to effect the separation and subsequent welding of the electrodes. By this means, the control of the mechanism is directly effected by the welding-current circuits and an arc is established between the electrodes at the instant current is induced in the secondary circuit by the separation of the electrodes or members to be welded.

Several schemes of electrical connections may be employed. In one instance, the electrodes are separated by a solenoid which is de-energized by the collapse of the primary field, and, in an alternate scheme, the electrodes are separated by a magnet which becomes energized by the building up of the secondary or welding current.

In the accompanying drawing forming a part hereof and in which like reference characters indicate like parts, Figure 1 is a graph showing the relation of the primary and secondary currents in the welding process.

Fig. 2 is a diagrammatic view of an electrical timing means for actuating the working parts in an electro-percussive welding system, and Fig. 3 is a similar view showing an alternate arrangement for electrically timing the welding operation.

To more readily understand the electrical timing of the operating parts, the curves of Fig. 1 should be noted, in which ordinates represent current values and abscissæ time. Curve 1 represents the primary current which is generally built up by a source of electrical energy, such as a direct-current generator, and curve 2 represents the secondary current.

The primary current maintains its maximum value until the primary circuit is broken at point 3. As the primary current decreases to zero value 4, a current 5 is induced in the secondary, which attains its maximum value 6 when the primary current has dropped to zero. The secondary current then decreases with the natural decrement of the circuit until point 7, where the arc is drawn by the separation of the electrodes. From this point, the current decreases at a much faster rate until point 8, where the weld occurs.

The welding operation must be so timed that the secondary circuit will be opened at the instant it has attained its maximum current value, for there must be sufficient time lag, indicated by the distance 9 to 10, to prevent an electric discharge between the electrodes before the primary is completely broken.

As shown in Fig. 2, a pair of electrodes or members 11 and 12 to be welded are held by a gripping member 13 and a lever 14, respectively, so that the adjacent ends make contact. A coil spring 15 is secured between the electrode 11 and the lever 14 to provide a mechanical time lag. The lever 14 is pivotally mounted on a support 16 and is held in position by a solenoid 17 which is connected in series with the primary winding 18. A dash pot 19 may be mounted on lever 14 to further provide for a mechanical time lag. The electrodes 11 and 12 are connected to the secondary winding 20 which interlocks with the primary winding 18 to constitute the secondary circuit.

To weld the electrodes 11 and 12 together, the primary circuit is energized until it attains a current value 3, simultaneously energizing magnet 17 which acts upon lever 14. Dash pot 19 operates to produce a time lag sufficient to prevent electrodes 11 and 12 contacting before the primary current has reached its maximum. The primary circuit is then opened, causing the field to collapse, which induces a current in the secondary winding. At this instant, the current 4 in the primary winding 18 is zero, and the current value 6 in the secondary is a maximum.

The magnet 17 is de-energized, releasing lever 14 which, with the aid of dash pot 19 and spring 15, allows a sufficient time to lag between the collapse of the primary and the building up of the secondary to insure the proper balancing of the current values before separation of the electrodes takes place. The electrodes then separate, causing an arc to be formed between them which fuses the adjacent surfaces thereof. The fused surfaces are then brought into percussive engagement by means of a weight dropping upon the gripping member 13.

In the apparatus shown in Fig. 3 a pair of electrodes 21 and 22 are held in position by a gripping member 23, adapted to be engaged by a movable weight 24, and a lever 25 which is pivotally mounted on a support 26, respectively. An armature 27 is secured to the lever 25 at a point between the support 26 and the free end 28 of lever 25. A solenoid 29, connected in series with the secondary circuit 30, is so mounted as to engage armature 27 when energized. A coil spring 31 that is secured adjacent to the free end 28 of lever 25, tends to hold the electrodes 21 and 22 in engagement. A dash pot 32 is secured to the upper portion of lever 25 to act as a mechanical lag in closing the secondary circuit upon breaking the primary circuit 33.

To form a weld, the primary circuit 33 is energized to the desired current value and a magnetic field is established. The primary is then opened, causing the field to collapse, thus inducing a current in the interlocking windings of the secondary. The induced current is of a momentarily high value, as indicated by the curve in Fig. 1. The solenoid 29 is so wound as to become sufficiently energized when the current value is at, or slightly beyond, the peak 6 to attract the armature 27 against the combined lag of dash pot 32 and coil spring 31 to cause the separation of electrodes 21 and 22, forming an arc therebetween to fuse the adjacent surfaces thereof. The fused surfaces are then brought into percussive engagement to weld them together.

From the above description of my invention, it will be obvious that I have provided simple and efficient means for automatically joining a pair of electrodes by electro-percussive welding. It is also apparent that the electrical timing device is positive in its operation.

My apparatus is simple in construction and contains but few moving parts. The action thereof is entirely automatic and it provides uniformity in time and current value, since these functions are solely dependent on the conditions in the welding circuits. The separation of the electrodes cannot take place until the current in the welding circuit has attained its maximum value.

Although I have described several specific embodiments of my invention it will be obvious to those skilled in the art that various modifications may be made in the form of the apparatus employed without departing from the principles herein set forth. For instance, the dash pot or the coil spring or both may be eliminated or secured in other positions relative to the lever, or the positions of the solenoids may be altered.

I claim as my invention:—

1. In an electro-percussive welding system, means for separating electrodes to be welded comprising a solenoid-actuating contact member.

2. In an electro-percussive welding system having primary and secondary circuits, means for separating electrodes to be welded comprising a solenoid-actuated contact member energized by the current in the secondary circuit.

3. In an electro-percussive welding system having primary and secondary circuits, means for separating electrodes to be welded comprising a solenoid-actuated contact member de-energized by the collapse of the primary field.

4. In an electro-percussive welding system, means for separating electrodes to be welded comprising a pair of gripping members, one of said members being secured to a movable weight and the other to a solenoid-actuated trip device, and means for energizing said solenoid to separate said electrodes to form an arc.

5. In an electro-percussive welding system, a plurality of electrodes, a solenoid-actuated lever and a spring secured between said lever and one of said electrodes.

6. In an electro-percussive welding system, a plurality of electrodes, a solenoid-actuated lever and a spring adapted to cause said electrodes to engage.

7. In an electro-percussive welding system, a plurality of electrodes, a solenoid-actuated lever and resilient means for causing movement of said lever.

8. In an electro-percussive welding system, a plurality of electrodes, a plurality of gripping members, one of said members being secured to a movable weight and the other to a solenoid-actuated trip device for holding said electrodes, a spring secured between one of said electrodes and said trip device, a dash pot and means for bringing the adjacent surfaces of said electrodes into percussive engagement.

In testimony whereof, I have hereunto subscribed my name this 6th day of May, 1921.

CHARLES F. WAGNER.